(12) United States Patent
Katayama et al.

(10) Patent No.: US 11,161,605 B2
(45) Date of Patent: Nov. 2, 2021

(54) AIR VEHICLE AND METHOD OF CONTROLLING AIR VEHICLE

(71) Applicant: KAWASAKI JUKOGYO KABUSHIKI KAISHA, Kobe (JP)

(72) Inventors: Noriaki Katayama, Niwa-gun (JP); Kaoru Kouchi, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 369 days.

(21) Appl. No.: 16/059,908

(22) Filed: Aug. 9, 2018

(65) Prior Publication Data
US 2019/0047693 A1    Feb. 14, 2019

(30) Foreign Application Priority Data

Aug. 10, 2017  (JP) .............................. JP2017-155967

(51) Int. Cl.
*B64C 27/52* (2006.01)
*B64C 27/26* (2006.01)
(Continued)

(52) U.S. Cl.
CPC ............ *B64C 27/52* (2013.01); *B64C 13/503* (2013.01); *B64C 15/12* (2013.01); *B64C 27/08* (2013.01);
(Continued)

(58) Field of Classification Search
CPC ..... B64C 27/08; B64C 27/52; B64C 29/0033; B64C 29/0075; B64C 15/12
See application file for complete search history.

(56) References Cited

U.S. PATENT DOCUMENTS 4,880,071 A * 11/1989 Tracy .................. B64C 29/0033
180/117
5,419,514 A *  5/1995 Ducan ................. B64C 29/0033
244/12.4
(Continued)

FOREIGN PATENT DOCUMENTS

JP         H04-173497 A      6/1992

OTHER PUBLICATIONS

Rod Machado, Lesson 2: Turns, 2013, Krepelka.com, http://krepelka.com/fsweb/lessons/student/studentlessons02.htm (Year: 2013).*
(Continued)

*Primary Examiner* — Richard R. Green
*Assistant Examiner* — William L Gmoser
(74) *Attorney, Agent, or Firm* — Oliff PLC

(57) ABSTRACT

A fuselage, a support part supporting the fuselage, a thrust generation unit including fore, aft, left, and right thrust generators, and a flight controller controlling the unit are included. The fore, aft, left, and right thrust generators are respectively positioned on first, second, third, and fourth axes respectively extending in support part fore and aft, fore and aft, left and right, and left and right directions. The generators are respectively at the support part front, back, left, and right. The generators respectively generate thrust in directions intersecting the first, second, third, and fourth axes and can change thrust magnitude and direction around them. All generators are connected to the support part.

6 Claims, 13 Drawing Sheets

(51) Int. Cl.
  *B64C 13/50* (2006.01)
  *B64C 27/08* (2006.01)
  *B64C 29/00* (2006.01)
  *B64C 15/12* (2006.01)
(52) U.S. Cl.
  CPC .......... *B64C 27/26* (2013.01); *B64C 29/0033* (2013.01); *B64C 29/0075* (2013.01)

(56) References Cited

U.S. PATENT DOCUMENTS

| | | | | |
|---|---|---|---|---|
| 9,902,493 | B2* | 2/2018 | Simon | B64C 29/0025 |
| 2006/0226281 | A1* | 10/2006 | Walton | B64C 29/0033 244/17.23 |
| 2009/0008499 | A1* | 1/2009 | Shaw | B64C 27/08 244/17.23 |
| 2010/0301168 | A1* | 12/2010 | Raposo | A63H 23/00 244/171.2 |
| 2012/0261523 | A1* | 10/2012 | Shaw | B64C 27/28 244/7 R |
| 2015/0274289 | A1* | 10/2015 | Newman | B64C 29/0025 244/12.4 |
| 2017/0152935 | A1* | 6/2017 | Filter | B64C 29/0025 |
| 2018/0037317 | A1* | 2/2018 | Ichihara | B64C 39/024 |
| 2018/0086448 | A1* | 3/2018 | Kroo | B64C 29/0033 |
| 2018/0265189 | A1* | 9/2018 | Zhang | B64C 27/20 |
| 2018/0346113 | A1* | 12/2018 | Chang | B64C 27/52 |
| 2018/0346136 | A1* | 12/2018 | Arkus | B64D 27/08 |
| 2019/0016461 | A1* | 1/2019 | Chang | B64C 27/52 |
| 2019/0039724 | A1* | 2/2019 | Konishi | B64C 27/52 |

OTHER PUBLICATIONS

Banked turns, 2015, Wikipedia, https://en.wikipedia.org/wiki/Banked_turn (Year: 2015).*

* cited by examiner

AIR VEHICLE AND METHOD OF CONTROLLING AIR VEHICLE

TECHNICAL FIELD

The present invention relates to an air vehicle and a method of controlling an air vehicle.

BACKGROUND ART

Air vehicles flying in the air by rotating a plurality of rotors have been known (see, for example, PTL 1).

Such an air vehicle includes four rotors driven simultaneously or separately by a power source, two of which are vertical thrust rotors, and the other two are vertical-, forward-, and turning-movement rotors. The vertical-, forward-, and turning-movement rotors are configured to rotate with being tilted, and the tilted rotation makes a forward movement. Further, a turning movement is made by causing a difference in rotation speed between the vertical-, forward-, and turning-movement rotors.

CITATION LIST

Patent Literature

PTL 1: JP H04-173497 A

SUMMARY OF INVENTION

Technical Problem

However, the air vehicle described in PTL 1 has a problem that, for example, when the attitude of the air vehicle during hovering is disturbed around the roll axis due to disturbance such as a gust and then the air vehicle deviates from a predetermined position in the lateral direction, it is difficult for the air vehicle to promptly return to the original position and attitude.

Solution to Problem

In order to solve the above problem, an air vehicle according to an aspect of the present invention includes a fuselage, a support part configured to support the fuselage, a thrust generation unit including a fore thrust generator, an aft thrust generator, a left thrust generator, and a right thrust generator, and a flight controller configured to control the thrust generation unit. The fore thrust generator is positioned on a first axis extending in a fore and aft direction of the support part and at front of the support part and is connected to the support part, the fore thrust generator being configured to generate thrust in a direction intersecting the first axis and to be capable of changing magnitude of the thrust and a direction of the thrust around the first axis, the aft thrust generator is positioned on a second axis extending in the fore and aft direction of the support part and at back of the support part and is connected to the support part, the aft thrust generator being configured to generate thrust in a direction intersecting the second axis and to be capable of changing magnitude of the thrust and a direction of the thrust around the second axis, the left thrust generator is positioned on a third axis extending in a left and right direction of the support part and at left of the support part and is connected to the support part, the left thrust generator being configured to generate thrust in a direction intersecting the third axis and to be capable of changing magnitude of the thrust and a direction of the thrust around the third axis, and the right thrust generator is positioned on a fourth axis extending in the left and right direction of the support part and at right of the support part and is connected to the support part, the right thrust generator being configured to generate thrust in a direction intersecting the fourth axis and to be capable of changing magnitude of the thrust and a direction of the thrust around the fourth axis.

This configuration allows six types of control including control of three forces in X-axis, Y-axis, Z-axis directions, and control of three moments around a pitch axis, a roll axis, and a yaw axis to be separately performed. Accordingly, it is possible to inhibit an unnecessary change in attitude around the pitch axis, the roll axis, or the yaw axis that may occur due to the position or speed control in the X-axis, Y-axis, or Z-axis direction.

Further, when the position or attitude of the air vehicle is disturbed due to disturbance such as a gust, it is possible to promptly return the air vehicle to the original position or the original attitude.

Advantageous Effects of Invention

The present invention has the effect that the six types of control including the control of three forces in the X-axis, Y-axis, and Z-axis directions and the control of three moments around the pitch axis, the roll axis, and the yaw axis can be separately performed.

DESCRIPTION OF EMBODIMENTS

Figure 1:
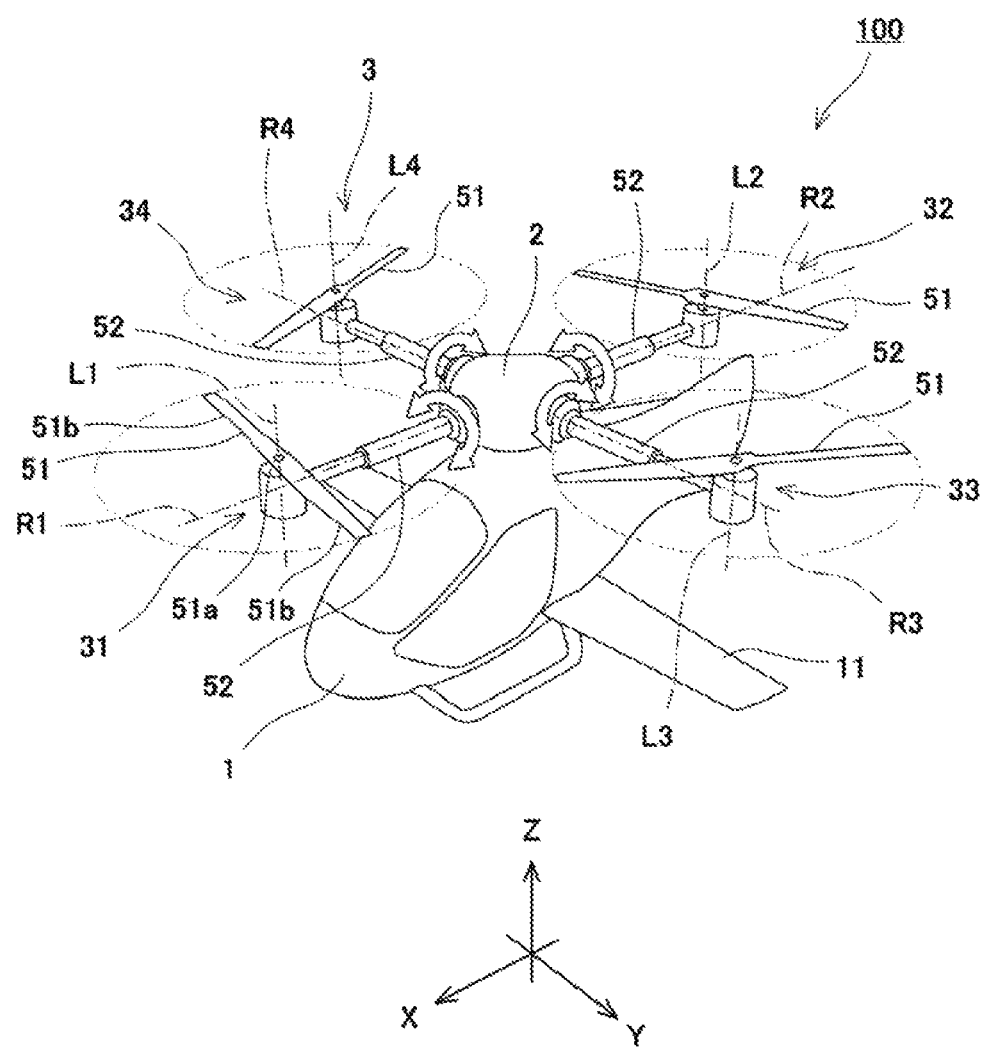
FIG. 1 is a perspective view showing a configuration example of an air vehicle according to a first embodiment.

An air vehicle according to an aspect includes a fuselage, a support part configured to support the fuselage, a thrust generation unit including a fore thrust generator, an aft thrust generator, a left thrust generator, and a right thrust generator, and a flight controller configured to control the thrust generation unit. The fore thrust generator is positioned on a first axis extending in a fore and aft direction of the support part and at front of the support part and is connected to the support part, the fore thrust generator being configured to generate thrust in a direction intersecting the first axis and to be capable of changing magnitude of the thrust and a direction of the thrust around the first axis, the aft thrust generator is positioned on a second axis extending in the fore and aft direction of the support part and at back of the support part and is connected to the support part, the aft thrust generator being configured to generate thrust in a direction intersecting the second axis and to be capable of changing magnitude of the thrust and a direction of the thrust around the second axis, the left thrust generator is positioned on a third axis extending in a left and right direction of the support part and at left of the support part and is connected to the support part, the left thrust generator being configured to generate thrust in a direction intersecting the third axis and to be capable of changing magnitude of the thrust and a direction of the thrust around the third axis, and the right thrust generator is positioned on a fourth axis extending in the left and right direction of the support part and at right of the support part and is connected to the support part, the right thrust generator being configured to generate thrust in a direction intersecting the fourth axis and to be capable of changing magnitude of the thrust and a direction of the thrust around the fourth axis.

This configuration allows six types of control including control of three forces in X-axis, Y-axis, Z-axis directions, and control of three moments around a pitch axis, a roll axis, and a yaw axis to be separately performed. Accordingly, it is possible to inhibit an unnecessary change in attitude around the pitch axis, the roll axis, or the yaw axis that may occur due to the position or speed control in the X-axis, Y-axis, or Z-axis direction.

Further, when the position or attitude of the air vehicle is disturbed due to disturbance such as a gust, it is possible to promptly return the air vehicle to the original position or the original attitude.

The flight controller may cause the direction of the thrust generated by the left thrust generator to tilt toward a fore side or an aft side around the third axis and cause the direction of the thrust generated by the right thrust generator to tilt toward a fore side or an aft side around the fourth axis that is identical to the side toward which the direction of the thrust generated by the left thrust generator is tilted to control a component in the fore and aft direction of the fuselage of thrust generated by the thrust generation unit, and cause the direction of the thrust generated by the fore thrust generator to tilt toward a left side or a right side around the first axis and cause the direction of the thrust generated by the aft thrust generator to tilt toward a left side or a right side around the second axis that is identical to the side toward which the direction of the thrust generated by the fore thrust generator is tilted to control a component in the left and right direction of the fuselage of the thrust generated by the thrust generation unit.

This configuration allows control of two forces in the X-axis and Y-axis directions to be appropriately performed.

The flight controller may cause the directions of the thrust generated by the fore thrust generator, the thrust generated by the aft thrust generator, the thrust generated by the left thrust generator, and the thrust generated by the right thrust generator to tilt toward the same side in a circumferential direction around an axis extending in a vertical direction of the support part to control the attitude of the fuselage around the yaw axis.

This configuration allows a force used to control the attitude around the yaw axis to be increased.

The flight controller may calculate a direction of a resultant force of inertia and gravity received by the fuselage, cause a difference between the thrust generated by the fore thrust generator and the thrust generated by the aft thrust generator, and control the attitude of the fuselage around the pitch axis to tilt the fuselage in the direction of the resultant force.

This configuration allows the fuselage to be tilted in the direction of the resultant force of inertia, such as a centrifugal force, and gravity received by the fuselage.

The flight controller may calculate a direction of a resultant force of inertia and gravity received by the fuselage, cause a difference between the thrust generated by the left thrust generator and the thrust generated by the right thrust generator, and control the attitude of the fuselage around the roll axis to tilt the fuselage in the direction of the resultant force.

This configuration allows the fuselage to be tilted in the direction of the resultant force of inertia, such as a centrifugal force, and gravity received by the fuselage.

The flight controller may calculate a direction of a resultant force of inertia and gravity received by the fuselage, cause a difference between the thrust generated by the fore thrust generator and the thrust generated by the aft thrust generator and control the attitude of the fuselage around the pitch axis, and cause a difference between the thrust generated by the left thrust generator and the thrust generated by the right thrust generator and control the attitude of the fuselage around the roll axis to tilt the fuselage in the direction of the resultant force.

This configuration allows the fuselage to be tilted in the direction of the resultant force of inertia, such as a centrifugal force, and gravity received by the fuselage. In particular, during a turn, a balanced turn can be performed in which the air vehicle turns with the fuselage tilted in the direction of the resultant force of gravity and inertia such as a centrifugal force caused at a curve in a flight path.

The fuselage may accommodate an occupant.

This configuration can prevent the occupant in the fuselage from feeling uncomfortable acceleration in the fore and aft direction or in the left and right direction due to the balanced turn.

The fore thrust generator, the aft thrust generator, the left thrust generator, and the right thrust generator may each include a rotor configured to rotate around an axis extending in a direction intersecting a corresponding axis among the first axis, the second axis, the third axis, and the fourth axis, a support beam having a distal end connected to the rotor and a proximal end connected to the support part rotatably around the corresponding axis, a rotor drive part configured to rotate the rotor, and a support beam drive part configured to rotationally move the support beam around the corresponding axis.

This configuration allows each of the thrust generators to be simplified in terms of structure, which is advantageous for manufacturing and makes manufacturing cost low.

The fuselage may include a seat to be straddled by a pilot.

This configuration allows posture of the pilot in the fuselage to be stable and allows the pilot to feel a greater sense of unity with the fuselage, thereby allowing the pilot to easily grasp the attitude of the fuselage.

A method of controlling an air vehicle according to an aspect is a method of controlling an air vehicle including a fuselage, a support part configured to support the fuselage, a thrust generation unit including a fore thrust generator, an aft thrust generator, a left thrust generator, and a right thrust generator, and a flight controller configured to control the thrust generation unit, the fore thrust generator being positioned on a first axis extending in a fore and aft direction of the support part and at front of the support part and being connected to the support part, the fore thrust generator being configured to generate thrust in a direction intersecting the first axis and to be capable of changing magnitude of the thrust and a direction of the thrust around the first axis, the aft thrust generator being positioned on a second axis extending in the fore and aft direction of the support part and at back of the support part and being connected to the support part, the aft thrust generator being configured to generate thrust in a direction intersecting the second axis and to be capable of changing magnitude of the thrust and a direction of the thrust around the second axis, the left thrust generator being positioned on a third axis extending in a left and right direction of the support part and at left of the support part and being connected to the support part, the left thrust generator being configured to generate thrust in a direction intersecting the third axis and to be capable of changing magnitude of the thrust and a direction of the thrust around the third axis, and the right thrust generator being positioned on a fourth axis extending in the left and right direction of the support part and at right of the support part and being connected to the support part, the right thrust generator being configured to generate thrust in a direction intersecting the fourth axis and to be capable of changing magnitude of the thrust and a direction of the thrust around the fourth axis. The method includes the steps of causing the direction of the thrust generated by the left thrust generator to tilt toward a fore side or an aft side around the third axis and causing the direction of the thrust generated by the right thrust generator to tilt toward a fore side or an aft side around the fourth axis that is identical to the side toward which the direction of the thrust generated by the left thrust generator is tilted to control a component in the fore and aft direction of the fuselage of thrust generated by the thrust generation unit, and causing the direction of the thrust generated by the fore thrust generator to tilt toward a left side or a right side around the first axis and causing the direction of the thrust generated by the aft thrust generator to tilt toward a left side or a right side around the second axis that is identical to the side toward which the direction of the thrust generated by the fore thrust generator is tilted to control a component in the left and right direction of the fuselage of the thrust generated by the thrust generation unit.

This configuration allows six types of control including control of three forces in X-axis, Y-axis, Z-axis directions, and control of three moments around a pitch axis, a roll axis, and a yaw axis to be separately performed. Accordingly, it is possible to inhibit an unnecessary change in attitude around the pitch axis, the roll axis, or the yaw axis that may occur due to the position or speed control in the X-axis, Y-axis, or Z-axis direction.

Further, when the position or attitude of the air vehicle is disturbed due to disturbance such as a gust, it is possible to promptly return the air vehicle to the original position or the original attitude.

The method may further include a step of causing the directions of the thrust generated by the fore thrust generator, the thrust generated by the aft thrust generator, the thrust generated by the left thrust generator, and the thrust generated by the right thrust generator to tilt toward the same side in a circumferential direction around an axis extending in a vertical direction of the support part to control the attitude of the fuselage around the yaw axis.

This configuration allows a force used to control the attitude around the yaw axis to be increased.

The method may further include the steps of calculating a direction of a resultant force of inertia and gravity received by the fuselage, and causing a difference between the thrust generated by the fore thrust generator and the thrust generated by the aft thrust generator and controlling an attitude of the fuselage around a pitch axis to tilt the fuselage in the direction of the resultant force.

This configuration allows the fuselage to be tilted in the direction of the resultant force of inertia, such as a centrifugal force, and gravity received by the fuselage.

The method may further include the steps of calculating a direction of a resultant force of inertia and gravity received by the fuselage, and causing a difference between the thrust generated by the left thrust generator and the thrust generated by the right thrust generator and controlling an attitude of the fuselage around a roll axis to tilt the fuselage in the direction of the resultant force.

This configuration allows the fuselage to be tilted in the direction of the resultant force of inertia, such as a centrifugal force, and gravity received by the fuselage.

The method may further include the steps of calculating a direction of a resultant force of inertia and gravity received by the fuselage, and causing a difference between the thrust generated by the fore thrust generator and the thrust generated by the aft thrust generator and controlling the attitude of the fuselage around the pitch axis, and causing a difference between the thrust generated by the left thrust generator and the thrust generated by the right thrust generator and controlling the attitude of the fuselage around the roll axis to tilt the fuselage in the direction of the resultant force.

This configuration allows the fuselage to be tilted in the direction of the resultant force of inertia, such as a centrifugal force, and gravity received by the fuselage. In particular, during a turn, a balanced turn can be performed in which the air vehicle turns with the fuselage tilted in the direction of the resultant force of gravity and inertia such as a centrifugal force caused at a curve in a flight path.

A method of controlling an air vehicle according to another aspect is a method of controlling an air vehicle including a fuselage, a support part configured to support the fuselage, a thrust generation unit including a fore thrust generator, an aft thrust generator, a left thrust generator, and a right thrust generator, a flight control information detector configured to detect a flight state and a maneuver input information, and a flight controller configured to control the thrust generation unit, the fore thrust generator being positioned on a first axis extending in a fore and aft direction of the support part and at front of the support part and being connected to the support part, the fore thrust generator being configured to generate thrust in a direction intersecting the first axis and to be capable of changing magnitude of the thrust and a direction of the thrust around the first axis, the aft thrust generator being positioned on a second axis extending in the fore and aft direction of the support part and at back of the support part and being connected to the support part, the aft thrust generator being configured to generate thrust in a direction intersecting the second axis and to be capable of changing magnitude of the thrust and a direction of the thrust around the second axis, the left thrust generator being positioned on a third axis extending in a left and right direction of the support part and at left of the support part and being connected to the support part, the left thrust generator being configured to generate thrust in a direction intersecting the third axis and to be capable of changing magnitude of the thrust and a direction of the thrust around the third axis, and the right thrust generator being positioned on a fourth axis extending in the left and right direction of the support part and at right of the support part and being connected to the support part, the right thrust generator being configured to generate thrust in a direction intersecting the fourth axis and to be capable of changing magnitude of the thrust and a direction of the thrust around the fourth axis. The method includes the steps of controlling, based on the flight state and the maneuver input information detected by the flight control information detector, magnitude of the thrust to be generated by each of the fore thrust generator, the aft thrust generator, the left thrust generator, and the right thrust generator, and controlling, based on information on acceleration received by the fuselage that has been detected by the flight control information detector, the direction of the thrust generated by each of the fore thrust generator, the aft thrust generator, the left thrust generator, and the right thrust generator to cause the acceleration received by the fuselage to approach a target value.

This configuration allows six types of control including control of three forces in X-axis, Y-axis, Z-axis directions, and control of three moments around a pitch axis, a roll axis, and a yaw axis to be separately performed. Accordingly, it is possible to inhibit an unnecessary change in attitude around the pitch axis, the roll axis, or the yaw axis that may occur due to the position or speed control in the X-axis, Y-axis, or Z-axis direction.

Further, when the position or attitude of the air vehicle is disturbed due to disturbance such as a gust, it is possible to promptly return the air vehicle to the original position or the original attitude.

The flight control information detector may detect inertia in the fore and aft direction received by the fuselage, and the step of controlling the direction of the thrust may include a step of causing, for reducing a fluctuation in the inertia in the fore and aft direction, the direction of the thrust generated by the left thrust generator to tilt toward a fore side or an aft side around the third axis and causing the direction of the thrust generated by the right thrust generator to tilt toward a fore side or an aft side around the fourth axis that is identical to the side toward which the direction of the thrust generated by the left thrust generator is tilted to control a component in the fore and aft direction of the fuselage of thrust generated by the thrust generation unit.

This configuration allows the fluctuation in the inertia in the fore and aft direction received by the fuselage to be smaller to make ride comfort for the occupant better, and allows a moment of inertia for the movement performed by controlling only the direction of each of the thrust generators to be small compared to a configuration where the direction of the entire fuselage is controlled through control of only the magnitude of the thrust generated by each of the thrust generators, thereby improving the responsiveness.

The flight control information detector may detect inertia in the left and right direction received by the fuselage, and the step of controlling the direction of the thrust may include a step of causing, for causing the inertia in the left and right direction to approach zero, the direction of the thrust generated by the fore thrust generator to tilt toward a left side or a right side around the first axis and causing the direction of the thrust generated by the aft thrust generator to tilt toward a left side or a right side around the second axis that is identical to the side toward which the direction of the thrust generated by the fore thrust generator is tilted to control a component in the left and right direction of the fuselage of thrust generated by the thrust generation unit.

This configuration allows the inertia in the left and right direction received by the fuselage to be smaller to make the ride comfort for the occupant better, and allows a moment of inertia for the movement performed by controlling only the direction of each of the thrust generators to be small compared to the configuration where the direction of the entire fuselage is controlled through control of only the magnitude of the thrust generated by each of the thrust generators, thereby improving the responsiveness.

The flight control information detector may detect inertia in the fore and aft direction and in the left and right direction received by the fuselage, and the step of controlling the direction of the thrust may include a step of causing, for reducing a fluctuation in the inertia in the fore and aft direction, the direction of the thrust generated by the left thrust generator to tilt toward the fore side or the aft side around the third axis and causing the direction of the thrust generated by the right thrust generator to tilt toward the fore side or the aft side around the fourth axis that is identical to the side toward which the direction of the thrust generated by the left thrust generator is tilted to control a component in the fore and aft direction of the fuselage of thrust generated by the thrust generation unit, and causing, for causing the inertia in the left and right direction to approach zero, the direction of the thrust generated by the fore thrust generator to tilt toward the left side or the right side around the first axis and causing the direction of the thrust generated by the aft thrust generator to tilt toward the left side or the right side around the second axis that is identical to the side toward which the direction of the thrust generated by the fore thrust generator is tilted to control a component in the left and right direction of the fuselage of the thrust generated by the thrust generation unit.

This configuration allows the inertia in the fore and aft direction and in the left and right direction received by the fuselage to be smaller to make the ride comfort for the occupant better, and allows a moment of inertia for the movement performed by controlling only the direction of each of the thrust generators to be small compared to the configuration where the direction of the entire fuselage is controlled through control of only the magnitude of the thrust generated by each of the thrust generators, thereby improving the responsiveness.

Hereinafter, embodiments will be described with reference to the drawings. It should be noted that the present invention is not limited by the following embodiments. In the following description, the same or corresponding elements are denoted by the same reference symbols throughout the drawings, and duplicate descriptions thereof will be omitted.

First Embodiment

FIG. 1 is a perspective view showing a configuration example of an air vehicle 100 according to a first embodiment.

The air vehicle 100 is a multi-rotor air vehicle capable of vertical takeoff and landing. The air vehicle 100 is, for example, a manned air vehicle but may be an unmanned air vehicle.

Figure 3:
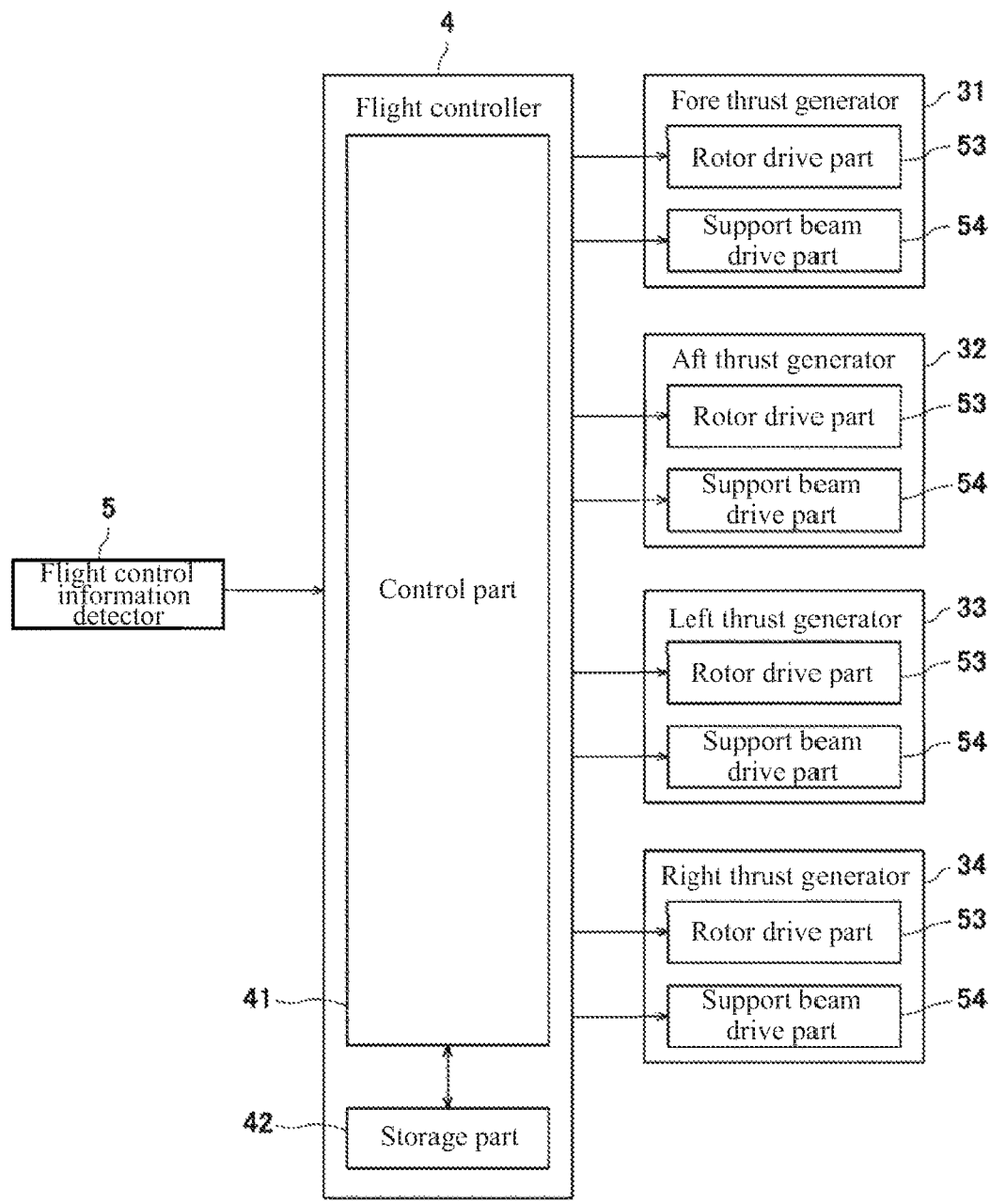
FIG. 3 is a block diagram schematically showing a configuration example of a control system of the air vehicle shown in FIG. 1.
Figure 4:
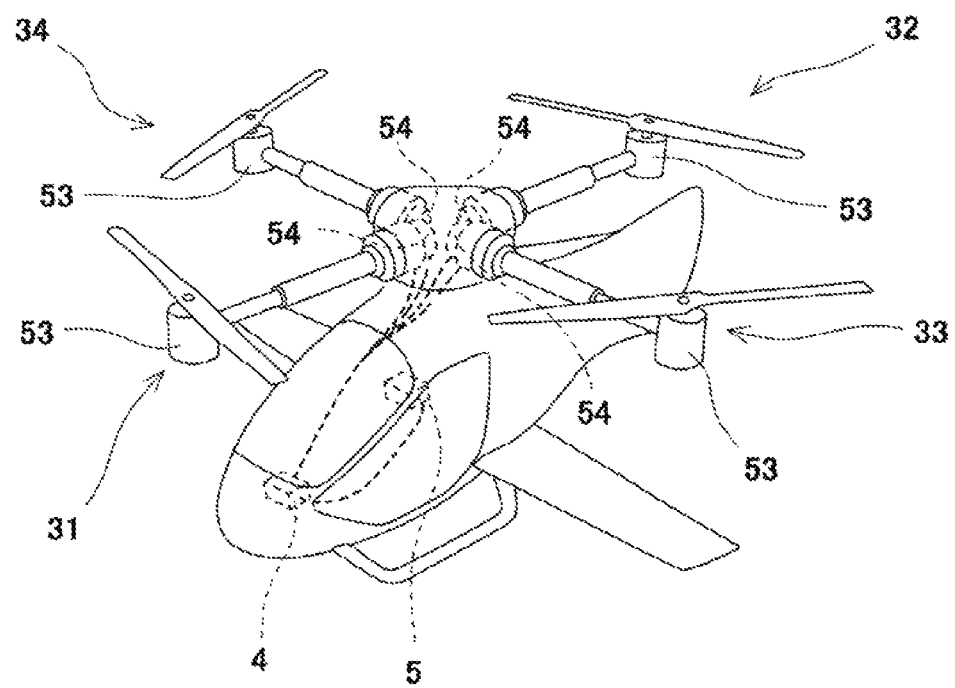
FIG. 4 is a perspective view schematically showing a configuration example of the control system of the air vehicle shown in FIG. 1.

As shown in FIG. 1, the air vehicle 100 includes a fuselage 1, a support part 2, a thrust generation unit 3, a flight controller 4 (see FIGS. 3 and 4), a flight control information detector 5 (see FIGS. 3 and 4).

The fuselage 1 is configured to accommodate an occupant such as a pilot and is provided with a maneuvering device (not shown) for maneuvering the air vehicle 100. The fuselage 1 may be further provided with a fixed wing part 11 that generates lift when the air vehicle 100 moves forward. This configuration can provide a margin to lift generated by the thrust generation unit 3 during high speed flight and thus allows greater thrust to be directed forward, thereby allowing the air vehicle 100 to move faster. Note that, in the present embodiment, the fuselage 1 is disposed below the thrust generation unit 3, but the present invention is not limited to such a disposition. Alternatively, the fuselage 1 may be disposed above the thrust generation unit 3, or may be disposed on the same plane as the thrust generation unit 3.

The support part 2 connects the thrust generation unit 3 and the fuselage 1, and supports the fuselage 1 with the fuselage 1 hung from the thrust generation unit 3. Note that the support part 2 may be integrally formed with the fuselage 1 without being distinguished from the fuselage 1.

Figure 2:
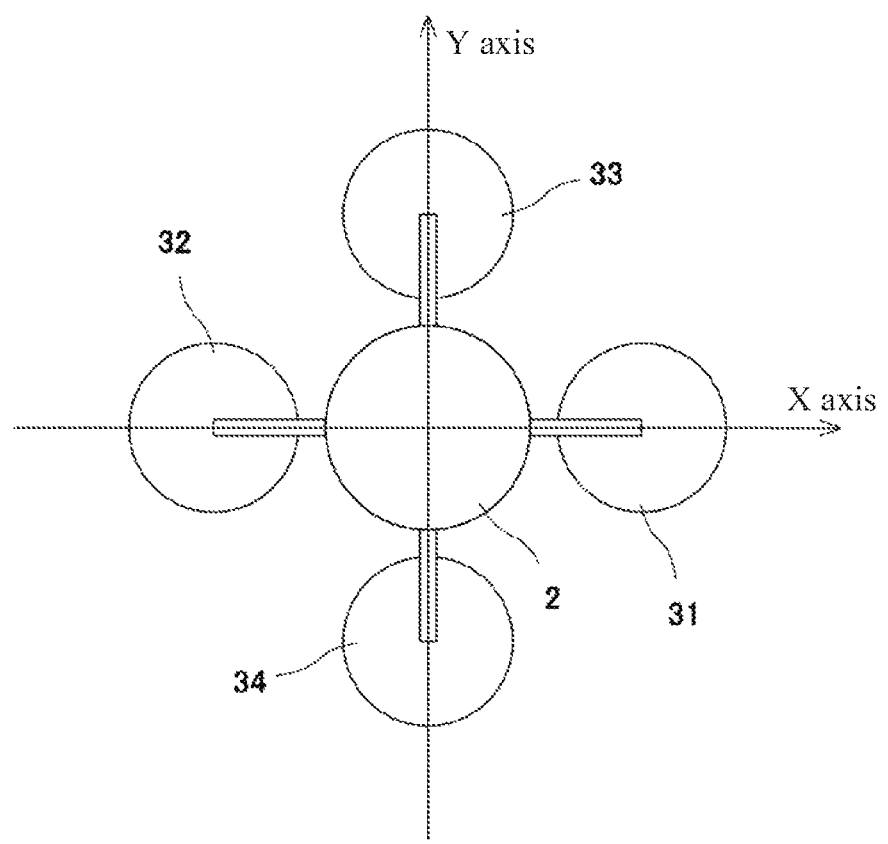
FIG. 2 is a plan view schematically showing a configuration example of a thrust generation unit of the air vehicle shown in FIG. 1.

FIG. 2 is a plan view schematically showing a configuration example of the thrust generation unit 3.

The thrust generation unit 3 is a mechanism that produces, for example, an air flow to generate thrust in a direction opposite to a direction of the air flow. As shown in FIG. 2, the thrust generation unit 3 includes four thrust generators positioned at the front, back, left, and right of the fuselage 1, namely, a fore thrust generator 31, an aft thrust generator 32, a left thrust generator 33, and a right thrust generator 34. That is, on a certain horizontal plane, the four thrust generators are arranged in 90-degree rotational symmetry. These four thrust generators are each, for example, a mechanism that produces thrust by rotating a rotor 51 (to be described later), but are not limited to such a mechanism.

The fore thrust generator 31 is positioned on a first axis R1 extending in a fore and aft direction of the support part 2. The fore thrust generator 31 is positioned at the front of the support part 2 and connected to the support part 2, and is configured to generate thrust in a direction intersecting the first axis R1. The fore thrust generator 31 is further configured to be capable of changing magnitude of the thrust and a direction of the thrust around the first axis R1.

The aft thrust generator 32 is positioned on a second axis R2 extending in the fore and aft direction of the support part 2. The aft thrust generator 32 is positioned at the back of the support part 2 and connected to the support part 2, and is configured to generate thrust in a direction intersecting the second axis R2. The aft thrust generator 32 is further configured to be capable of changing magnitude of the thrust and a direction of the thrust around the second axis R2. In the present embodiment, the first axis R1 and the second axis R2 are coaxial, and the extending direction of the first axis R1 and the second axis R2 is defined as an X direction. Further, the first axis R1 and the second axis R2 extend parallel to a roll axis of the air vehicle 100.

The left thrust generator 33 is positioned on a third axis R3 extending in a left and right direction of the support part 2. The left thrust generator 33 is positioned at the left of the support part 2 and connected to the support part 2, and is configured to generate thrust in a direction intersecting the third axis R3. The left thrust generator 33 is further configured to be capable of changing magnitude of the thrust and a direction of the thrust around the third axis R3.

The right thrust generator 34 is positioned on a fourth axis R4 extending in the left and right direction of the support part 2. The right thrust generator 34 is positioned at the right of the support part 2 and connected to the support part 2, and is configured to generate thrust in a direction intersecting the fourth axis R4. The right thrust generator 34 is further configured to be capable of changing magnitude of the thrust and a direction of the thrust around the fourth axis R4. In the present embodiment, the third axis R3 and the fourth axis R4 are coaxial, and the extending direction of the third axis R3 and the fourth axis R4 is defined as a Y direction orthogonal to the X direction. Further, the third axis R3 and the fourth axis R4 extend parallel to a pitch axis of the air vehicle 100. A direction orthogonal to the first axis R1 to the fourth axis R4 is defined as a Z direction.

In the present embodiment, as shown in FIG. 1, the fore thrust generator 31, the aft thrust generator 32, the left thrust generator 33, and the right thrust generator 34 each include the rotor 51, a support beam 52, a rotor drive part 53 (see FIGS. 3 and 4), and a support beam drive part 54 (see FIGS. 3 and 4).

The rotor 51 is a rotor blade that rotates around a predetermined axis. The rotor 51 of the fore thrust generator 31 rotates around an axis L1 extending in a direction intersecting the first axis R1. A locus of the rotor 51 when rotating is a rotor plane. The rotor 51 of the aft thrust generator 32 rotates around an axis L2 extending in a direction intersecting the second axis R2. The rotor 51 of the left thrust generator 33 rotates around an axis L3 extending in a direction intersecting the third axis R3. The rotor 51 of the right thrust generator 34 rotates around an axis L4 extending in a direction intersecting the fourth axis R4. The first axis R1 to the fourth axis R4 may be orthogonal to the axis L1 to the axis L4, respectively.

The rotor 51 including a rotor head 51a and two rotor blades 51b attached to the rotor head 51a and having a fixed angle of attack is given as an example in FIG. 1. The rotor head 51a and the rotor blades 51b may be connected via a joint (not shown) capable of changing the angle of attack of the rotor blades 51b.

The support beam 52 has a distal end connected to the rotor 51 and a proximal end connected to the support part 2 rotatably around the predetermined axis. The support beam 52 of the fore thrust generator 31 is connected to the support part 2 rotatably around the first axis R1. The support beam 52 of the aft thrust generator 32 is connected to the support part 2 rotatably around the second axis R2. The support beam 52 of the left thrust generator 33 is connected to the support part 2 rotatably around the third axis R3. The support beam 52 of the right thrust generator 34 is connected to the support part 2 rotatably around the fourth axis R4.

The rotor drive part 53 (see FIGS. 3 and 4) is a drive part that rotates the rotor 51. The rotor drive part 53 includes, for example, a drive source such as an electric motor or a reciprocating engine, and a drive force transmission mechanism such as a gear or a pulley that transmits a drive force from the drive source to the rotor 51. The rotor drive part 53 is configured to change a rotational drive output to change thrust to be generated. Further, the respective rotor drive parts 53 of the fore thrust generator 31, the aft thrust generator 32, the left thrust generator 33, and the right thrust generator 34 are each configured to rotate a corresponding rotor 51 and capable of changing the thrust generated by a corresponding thrust generator of the thrust generators 31 to 34 individually. Note that the thrust generated by each of the thrust generators 31 to 34 may be changed by changing the angle of attach of corresponding rotor blades 51b.

Note that the fore thrust generator 31, the aft thrust generator 32, the left thrust generator 33, and the right thrust generator 34 are configured to include the even number of rotors 51. The even number of rotors 51 are grouped into two groups each including the same number of rotors 51, and rotors 51 belonging to one of the groups are configured to rotate in a direction opposite to a direction in which rotors 51 belonging to the other group rotate. In the present embodiment, a configuration is employed where the fore thrust generator 31 and the aft thrust generator 32 belong to the one group, and the left thrust generator 33 and the right thrust generator 34 belong to the other group.

The support beam drive part 54 (see FIGS. 3 and 4) is a drive part that rotationally moves the support beam 52. The support beam drive part 54 includes a drive source such as an electric motor and a drive force transmission mechanism such as a gear or a link that transmits a drive force from the drive source to the support beam 52. The support beam drive parts 54 are configured to be capable of rotationally moving the support beams 52 of the fore thrust generator 31 and the aft thrust generator 32 to tilt the rotor planes of the rotors 51 of the fore thrust generator 31 and the aft thrust generator 32 to the left or the right, thereby causing the direction of the thrust to tilt toward the left or the right. The support beam drive parts 54 are further configured to be capable of rotationally moving the support beams 52 of the left thrust generator 33 and the right thrust generator 34 to tilt the rotor planes of the rotors 51 of the left thrust generator 33 and the right thrust generator 34 to the front or the back, thereby causing the direction of the thrust to tilt toward the front or the back. The respective support beam drive parts 54 of the fore thrust generator 31, the aft thrust generator 32, the left thrust generator 33, and the right thrust generator 34 are each configured to be capable of rotationally moving a corresponding support beam 52 to change a direction of the thrust generated by a corresponding thrust generator of the thrust generators 31 to 34.

As described above, the fuselage 1 is configured to be positioned substantially at a center of an area surrounded by the four thrust generators 31, 32, 33, and 34. This configuration allows the fuselage 1 to be positioned near a center of gravity of the air vehicle 100 and thus prevents the occupant in the fuselage 1 from being greatly shaken by a change in attitude of the air vehicle 100, thereby making ride comfort better.

FIG. 3 is a block diagram schematically showing a configuration example of a control system of the air vehicle 100. FIG. 4 is a perspective view schematically showing the configuration example of the control system of the air vehicle 100.

As shown in FIGS. 3 and 4, the flight control information detector 5 is a sensor that is mounted on the air vehicle 100 and detects information for detecting a flight state of the air vehicle 100 and a maneuver input. The flight control information detector 5 includes, for example, sensors such as a gyroscope, an acceleration sensor, a speed sensor, and a global positioning system (GPS). The flight control information detector 5 detects at least any of a position, a speed, and an acceleration of the air vehicle 100, detects attitude around the roll axis of the air vehicle 100, attitude around the pitch axis of the air vehicle 100, and attitude around a yaw axis of the air vehicle 100, detects a command input from the maneuvering apparatus, and outputs information thus detected.

The flight controller 4 includes, for example, a control part 41 having a computing unit such as a central processing unit (CPU) and a storage part 42 having memories such as a read only memory (ROM) and a random access memory (RAM). The information output from the flight control information detector 5 is input to the flight controller 4. The control part 41 may be a single controller that performs centralized control, or may be composed of a plurality of controllers that cooperate with each other to perform distributed control. The flight controller 4 controls, based on at least any of a flight control program stored in the storage part 42 and information detected by the flight control information detector 5 on flight control including maneuver contents input by the pilot to the maneuvering device, the respective rotor drive parts 53 and support beam drive parts 54 of the fore thrust generator 31, the aft thrust generator 32, the left thrust generator 33, and the right thrust generator 34 to control three forces in X-axis, Y-axis, and Z-axis directions of the air vehicle 100 and three moments around the pitch axis, the roll axis, and the yaw axis. A predetermined control program is stored in the storage part 42, and the control part 41 executes the predetermined control program to perform the flight control of the air vehicle 100.

Operation Example

Figure 5:
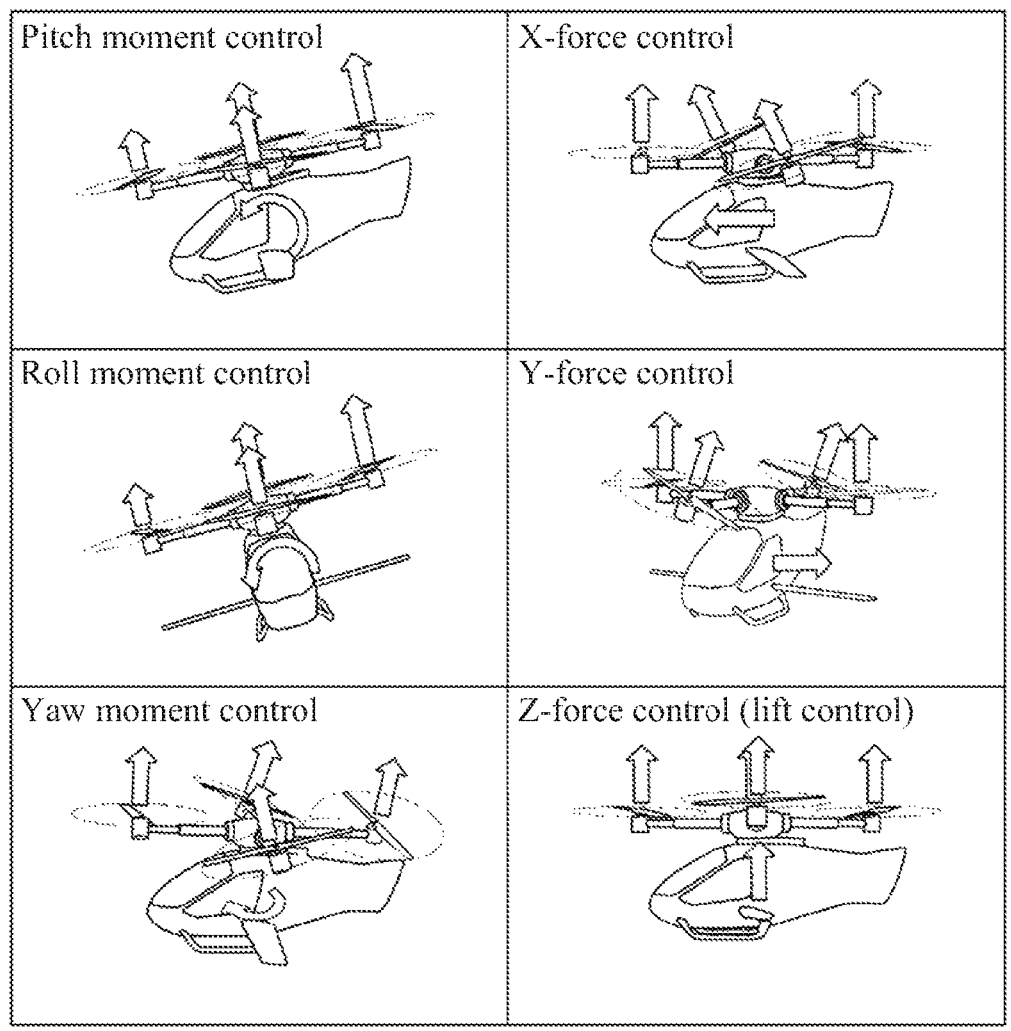
FIG. 5 is a diagram showing an outline of flight control of the air vehicle shown in FIG. 1.

Hereinafter, the flight control of the air vehicle 100 will be described in detail. FIG. 5 is a diagram showing an outline of the flight control of the air vehicle 100.
(Force Control in X-Axis Direction)

To move the air vehicle 100 forward in the X-axis direction, the flight controller 4 rotationally moves the left thrust generator 33 and the right thrust generator 34 around the third axis R3 and the fourth axis R4, respectively, to cause the directions of the thrust generated by the left thrust generator 33 and the thrust generated by the right thrust generator 34 to tilt toward a fore side of the fuselage 1 around the third axis R3 and the fourth axis R4, that is, to tilt the rotor planes of the left thrust generator 33 and the right thrust generator 34 to the fore side of the fuselage 1 around the third axis R3 and the fourth axis R4. This control allows a forward component in the X-axis direction to be generated in the thrust generated by the thrust generation unit 3, thereby moving the air vehicle 100 forward in the X-axis direction.

Further, to move the air vehicle 100 backward in the X-axis direction, the flight controller 4 rotationally moves the left thrust generator 33 and the right thrust generator 34 around the third axis R3 and the fourth axis R4, respectively, to cause the directions of the thrust generated by the left thrust generator 33 and the thrust generated by the right thrust generator 34 to tilt toward an aft side of the fuselage 1 around the third axis R3 and the fourth axis R4, that is, to tilt the rotor planes of the left thrust generator 33 and the right thrust generator 34 to the aft side of the fuselage 1 around the third axis R3 and the fourth axis R4. This control allows a backward component in the X-axis direction to be generated in the thrust generated by the thrust generation unit 3, thereby moving the air vehicle 100 backward in the X-axis direction.

As described above, the movement of the air vehicle 100 in the X-axis direction can be controlled.

(Force Control in Y-Axis Direction)

To move the air vehicle 100 leftward in the Y-axis direction, the flight controller 4 rotationally moves the fore thrust generator 31 and the aft thrust generator 32 around the first axis R1 and the second axis R2, respectively, to cause the directions of the thrust generated by the fore thrust generator 31 and the thrust generated by the aft thrust generator 32 to tilt toward a left side of the fuselage 1 around the first axis R1 and the second axis R2, that is, to tilt the rotor planes of the fore thrust generator 31 and the aft thrust generator 32 to the left side of the fuselage 1 around the first axis R1 and the second axis R2. This control allows a leftward component in the Y-axis direction to be generated in the thrust generated by the thrust generation unit 3, thereby moving the air vehicle 100 leftward in the Y-axis direction.

To move the air vehicle 100 rightward in the Y-axis direction, the flight controller 4 rotationally moves the fore thrust generator 31 and the aft thrust generator 32 around the first axis R1 and the second axis R2, respectively, to cause the directions of the thrust generated by the fore thrust generator 31 and the thrust generated by the aft thrust generator 32 to tilt toward a right side of the fuselage 1 around the first axis R1 and the second axis R2, that is, to tilt the rotor planes of the fore thrust generator 31 and the aft thrust generator 32 to the right side of the fuselage 1 around the first axis R1 and the second axis R2. This control allows a rightward component in the Y-axis direction to be generated in the thrust generated by the thrust generation unit 3, thereby moving the air vehicle 100 rightward in the Y-axis direction.

As described above, the movement of the air vehicle 100 in the Y-axis direction can be controlled.

(Force Control in Z-Axis Direction)

To move the air vehicle 100 upward in the Z-axis direction (to cause the air vehicle 100 to ascend), the flight controller 4 drives the support beam drive parts 54 of the fore thrust generator 31, the aft thrust generator 32, the left thrust generator 33, and the right thrust generator 34 to tilt the respective rotor planes upward. Then, the flight controller 4 increases the rotational drive output of the rotor drive part 53 of each of the thrust generators to increase an upward component of the thrust generated by the thrust generation unit 3. This control allows the air vehicle 100 to ascend.

To move the air vehicle 100 downward in the Z-axis direction (to cause the air vehicle 100 to descend), the flight controller 4 drives the support beam drive parts 54 of the fore thrust generator 31, the aft thrust generator 32, the left thrust generator 33, and the right thrust generator 34 to tilt the respective rotor planes upward. Then, the flight controller 4 decreases the rotational drive output of the rotor drive part 53 of each of the thrust generators to decrease the upward component of the thrust generated by the thrust generation unit 3. This control allows the air vehicle 100 to descend.

As described above, the movement of the air vehicle 100 in the Z-axis direction can be controlled.

(Moment Control Around Pitch Axis)

To generate a moment that causes the fuselage 1 to rotate around the pitch axis, the flight controller 4 causes a difference between the thrust generated by the fore thrust generator 31 and the thrust generated by the aft thrust generator 32.

That is, to rotate the fuselage 1 forward around the pitch axis as viewed from the occupant, the rotational drive output from the rotor drive part 53 of the fore thrust generator 31 and the rotational drive output from the rotor drive part 53 of the aft thrust generator 32 are made different from each other such that the thrust generated by the fore thrust generator 31 is smaller than the thrust generated by the aft thrust generator 32. Further, to rotate the fuselage 1 backward around the pitch axis as viewed from the occupant, the rotational drive output from the rotor drive part 53 of the fore thrust generator 31 and the rotational drive output from the rotor drive part 53 of the aft thrust generator 32 are made different from each other such that the thrust generated by the aft thrust generator 32 is smaller than the thrust generated by the fore thrust generator 31. As described above, the attitude of the fuselage 1 around the pitch axis can be controlled.

Note that the difference may be caused between the thrust generated by the fore thrust generator 31 and the thrust generated by the aft thrust generator 32 with a sum of the thrust generated by the fore thrust generator 31 and the thrust generated by the aft thrust generator 32 made constant. That is, the thrust generated by one of the thrust generators may be thrust corresponding to a result from adding a predetermined value to a reference value, and the thrust generated by the other thrust generator may be thrust corresponding to a result from subtracting the predetermined value from the reference value. This configuration allows a balance between torque in one direction around the Z axis generated by the fore thrust generator 31 and the aft thrust generator 32 and torque in the other direction around the Z axis generated by the left thrust generator 33 and the right thrust generator 34 to be kept, thereby preventing an attitude control around the pitch axis from affecting an attitude control around the yaw axis and simplifying the control of the air vehicle 100. Moment control around the roll axis (to be described later) may also be performed in the same manner.

(Moment Control Around Roll Axis)

To generate a moment that causes the fuselage 1 to rotate around the roll axis, the flight controller 4 causes a difference between the thrust generated by the left thrust generator 33 and the thrust generated by the right thrust generator 34.

That is, to rotate the fuselage 1 leftward around the roll axis as viewed from the occupant, the rotational drive output from the rotor drive part 53 of the left thrust generator 33 and the rotational drive output from the rotor drive part 53 of the right thrust generator 34 are made different from each other such that the thrust generated by the left thrust generator 33 is smaller than the thrust generated by the right thrust generator 34. Further, to rotate the fuselage 1 rightward around the roll axis as viewed from the occupant, the rotational drive output from the rotor drive part 53 of the left thrust generator 33 and the rotational drive output from the rotor drive part 53 of the right thrust generator 34 are made different from each other such that the thrust generated by the right thrust generator 34 is smaller than the thrust generated by the left thrust generator 33. As described above, the attitude of the fuselage 1 around the roll axis can be controlled.

(Moment Control Around Yaw Axis)

To generate a moment that causes the fuselage 1 to rotate around the yaw axis, the flight controller 4 causes the directions of the thrust generated by the fore thrust generator 31, the thrust generated by the aft thrust generator 32, the thrust generated by the left thrust generator 33, and the thrust generated by the right thrust generator 34 to tilt toward the same side in a circumferential direction around an axis extending in a vertical direction of the support part 2, that is, around the Z axis, to control the attitude of the fuselage 1 around the yaw axis.

That is, to rotate the fuselage 1 leftward around the yaw axis as viewed from the occupant, the fore thrust generator 31 is rotationally moved leftward around the first axis R1 such that the direction of the thrust generated by the fore thrust generator 31 is tilted toward the left side of the air vehicle 100, the left thrust generator 33 is rotationally moved backward around the third axis R3 such that the direction of the thrust generated by the left thrust generator 33 is tilted toward the aft side of the air vehicle 100, the aft thrust generator 32 is rotationally moved rightward around the second axis R2 such that the direction of the thrust generated by the aft thrust generator 32 is tilted toward the right side of the air vehicle 100, and the right thrust generator 34 is rotationally moved forward around the fourth axis R4 such that the direction of the thrust generated by the right thrust generator 34 is tilted toward the fore side of the air vehicle 100.

Further, to rotate the fuselage 1 rightward around the yaw axis as viewed from the occupant, the fore thrust generator 31 is rotationally moved rightward around the first axis R1 such that the direction of the thrust generated by the fore thrust generator 31 is tilted toward the right side of the air vehicle 100, the left thrust generator 33 is rotationally moved forward around the third axis R3 such that the direction of the thrust generated by the left thrust generator 33 is tilted toward the fore side of the air vehicle 100, the aft thrust generator 32 is rotationally moved leftward around the second axis R2 such that the direction of the thrust generated by the aft thrust generator 32 is tilted toward the left side of the air vehicle 100, and the right thrust generator 34 is rotationally moved backward around the fourth axis R4 such that the direction of the thrust generated by the right thrust generator 34 is tilted toward the aft side of the air vehicle 100.

Note that such a change in attitude of the fuselage 1 around the yaw axis can be also made by losing the balance between the torque in one direction around the Z axis generated by the rotation of the rotors 51 of the fore thrust generator 31 and the aft thrust generator 32 and the torque in the other direction around the Z axis generated by the rotation of the rotors 51 of the left thrust generator 33 and the right thrust generator 34. However, in the present embodiment, the air vehicle 100 is capable of performing the attitude control of the fuselage 1 around the yaw axis by using the thrust generated by the thrust generation unit 3, thereby making the control force large compared to the control made by losing the balance.

Note that the directions of the thrust generated by the fore thrust generator 31 and the thrust generated by the aft thrust generator 32 may be tilted toward the same side in the circumferential direction around the axis extending in the vertical direction of the support part 2, that is, around the Z axis, for the attitude control of the fuselage 1 around the yaw axis. Alternatively, the directions of the thrust generated by the left thrust generator 33 and the thrust generated by the right thrust generator 34 may be tilted toward the same side in the circumferential direction around the axis extending in the vertical direction of the support part 2, that is, around the Z axis, for the attitude control of the fuselage 1 around the yaw axis.

Note that such a change in attitude of the fuselage 1 around the yaw axis may be made in conjunction with the control made by losing the balance around the torque in one direction around the Z axis.

As described above, the air vehicle 100 is capable of separately performing six types of control including the movement in the X-axis direction, the movement in the Y-axis direction, the movement in the Z-axis direction, the change in attitude of the fuselage 1 around the roll axis, the change in attitude of the fuselage 1 around the pitch axis, and the change in attitude of the fuselage 1 around the yaw axis. That is, the position or speed of the fuselage 1 can be controlled without causing an unnecessary change in attitude of the fuselage 1, thereby allowing the attitude of the fuselage 1 to be stable.

Figure 6:
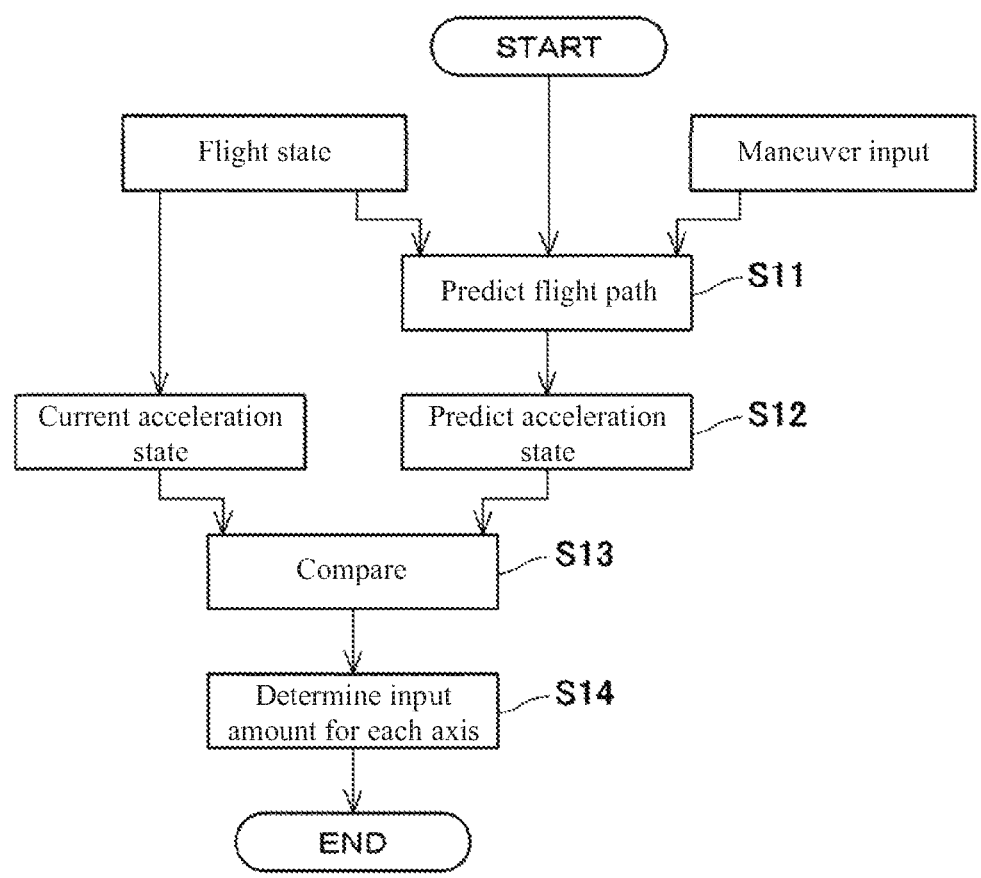
FIG. 6 is a flowchart showing attitude control during flight of the air vehicle shown in FIG. 1, the attitude control including a maneuver of the air vehicle such as a turn.

FIG. 6 is a flowchart showing the attitude control of the air vehicle 100 during flight, the attitude control including a maneuver such as a turn.

As shown in FIG. 6, in the attitude control, the flight controller 4 first predicts a flight path of the air vehicle 100 from the flight state and the maneuver input information detected by the flight control information detector 5 (step S11).

Next, the flight controller 4 calculates, based on the flight path thus predicted, a direction of a resultant force of inertia such as centrifugal force and gravity received by the fuselage 1 (step S12). That is, the flight controller 4 calculates a direction of acceleration acting on the fuselage 1 when the air vehicle 100 flies along the flight path thus predicted.

Next, the flight controller 4 compares the current acceleration received by the fuselage 1 and detected by the flight control information detector 5 with the acceleration thus predicted (step S13).

Next, the flight controller 4 controls attitude around at least one of the pitch axis and the roll axis of the fuselage 1 (step S14), and directs the fuselage 1 in the direction of the resultant force thus calculated. That is, the flight controller 4 determines an input amount for the pitch axis and the roll axis of the fuselage 1 such that the direction of the acceleration predicted in step S12 coincides with the Z axis of the fuselage and controls the attitude. This control allows the fuselage to be tilted in the direction of the resultant force of the inertia and the gravity received by the fuselage 1. In particular, during a turn, a balanced turn can be performed in which the air vehicle turns with the fuselage tilted in the direction of the resultant force of gravity and inertia such as a centrifugal force caused at a curve in a flight path. In the manned air vehicle, it is possible to prevent the occupant in the fuselage 1 from feeling uncomfortable acceleration in the fore and aft direction and the left and right direction. Note that, in parallel with this control, the force control in the X axis, Y axis, and Z-axis direction and the attitude control around the yaw axis may be performed.

Figure 7:
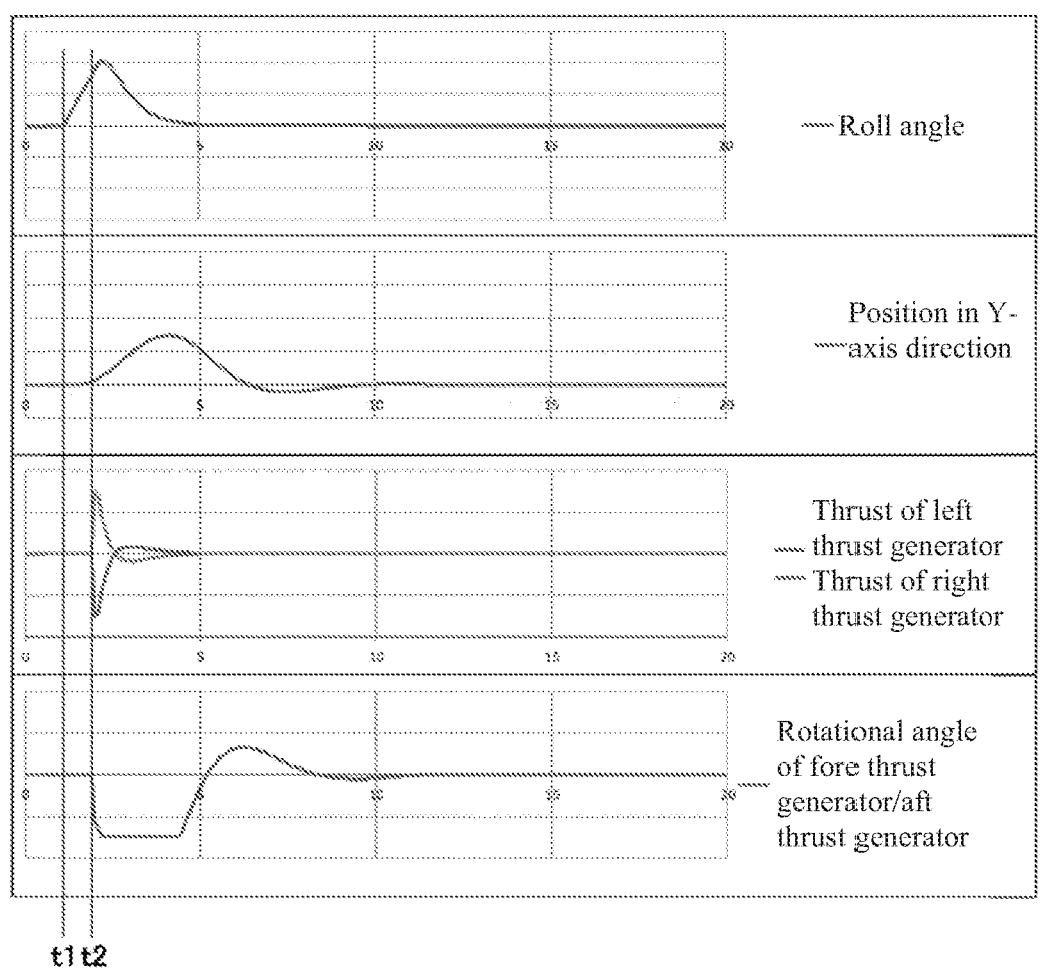
FIG. 7 is a timing chart showing a result of a flight simulation of the air vehicle shown in FIG. 1.

FIG. 7 is a timing chart showing a result of a flight simulation of the air vehicle 100, specifically showing a behavior of the air vehicle 100 after the attitude of the air vehicle 100 around the roll axis is disturbed due to disturbance at time t1 until the air vehicle 100 returns to an original position and attitude through control performed from time t2. In FIG. 7, a first row shows a change with time of an angle position of the air vehicle 100 around the roll axis, a second row shows a change with time of a position of the air vehicle 100 in the Y direction, a third row shows a change with time of the thrust of the left thrust generator 33 and the thrust of the right thrust generator 34 of the fuselage 100, and a fourth row shows a change with time of a rotational angle of the fore thrust generator 31 around the first axis R1 and a rotational angle of the aft thrust generator 32 around the second axis R2 of the air vehicle 100. Note that, as shown in the second row of FIG. 7, upon the fuselage 1 being tilted around the roll axis due to the disturbance at time t1 and the attitude of the fuselage 1 being disturbed, a component in the left and right direction of the fuselage 1 is generated in the thrust generated by the thrust generation unit 3, thereby moving the air vehicle 100 in the Y-axis direction and then causing the air vehicle 100 to deviate from the original position.

Figure 8:
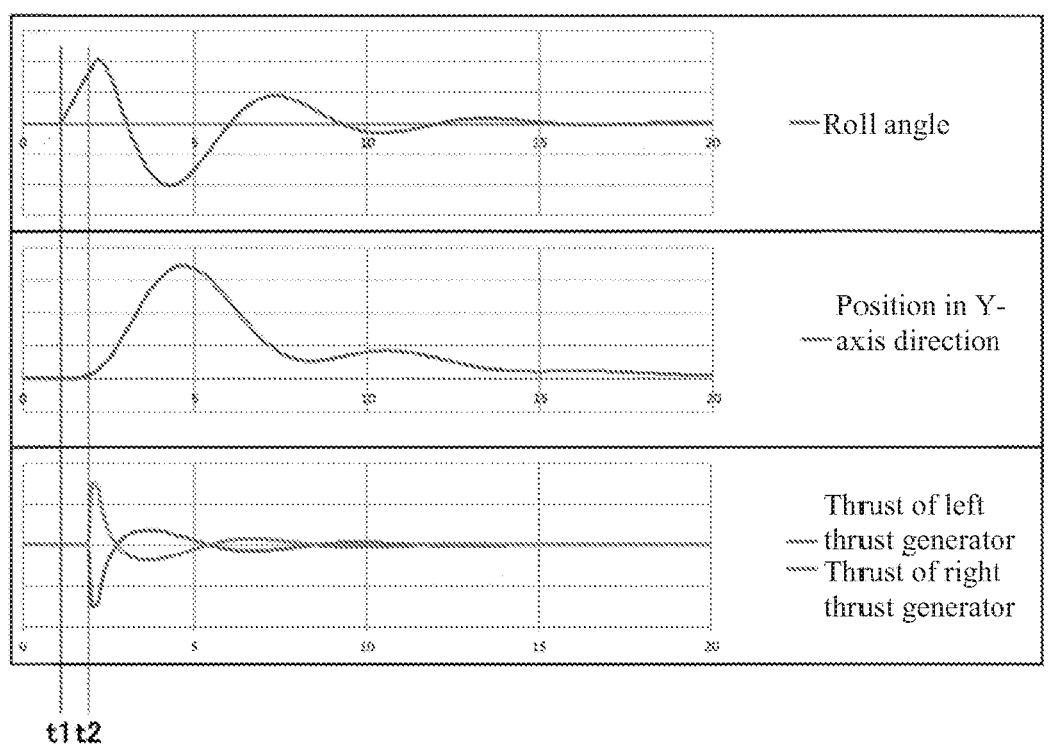
FIG. 8 is a timing chart showing a result of a flight simulation of a conventional air vehicle.

FIG. 8 is a timing chart showing a result of simulation using a conventional air vehicle under the same condition as is applied to the simulation shown in FIG. 7. As in FIG. 7, FIG. 8 shows a behavior of the conventional air vehicle after the attitude of the air vehicle around the roll axis is disturbed due to disturbance at time t1 until the conventional air vehicle returns to an original position and attitude through control performed from time t2. This conventional air vehicle is a well-known air vehicle in which a direction of thrust generated by a thrust generation unit is fixed in a predetermined direction with respect to a fuselage of the air vehicle (upward with respect to the fuselage). When this conventional air vehicle moves in the X-axis and Y-axis directions, control is performed by changing attitude around the pitch axis and the roll axis to generate thrust having a component in a moving direction. In FIG. 8, a first row shows a change with time of an angle position of the conventional air vehicle around the roll axis, a second row shows a change with time of a position of the conventional air vehicle in the Y direction, a third row shows a change with time of the thrust of the left thrust generator 33 and the thrust of the right thrust generator 34 of the conventional air vehicle.

As shown in FIG. 7, at time t2, the flight controller 4 causes a difference between the thrust generated by the left thrust generator 33 and the thrust generated by the right thrust generator 34 to rotate the fuselage 1 around the roll axis, thereby returning the fuselage 1 to the original attitude. It can be seen that the air vehicle 100 can be brought to the original attitude in a short time compared to the conventional air vehicle shown in FIG. 8. Accordingly, it is possible to prevent the occupant from being shaken back and forth, and right and left, thereby making ride comfort better. At the same time, the flight controller 4 causes the directions of the thrust generated by the fore thrust generator 31 and the thrust generated by the aft thrust generator 32 to tilt around the first axis R1 and the second axis R2, respectively, to generate a component in the Y-axis direction of the air vehicle 100 in the thrust generated by the thrust generation unit 3, thereby inhibiting the air vehicle 100 from moving to the right side in the Y-axis direction and causing the air vehicle 100 to move to the left side so as to return the air vehicle 100 to the original position. As described above, the air vehicle 100 is capable of controlling the position or speed with the attitude kept stable; thus, it can be seen that the air vehicle 100 can be brought to the original position in a short time compared to the conventional air vehicle shown in FIG. 8. Further, the fuselage 1 is capable of controlling the attitude separately from the control in the moving direction, thereby allowing the fuselage 1 to keep the attitude substantially horizontal that makes air resistance against the fuselage 1 small particularly during high speed forward flight to suppress the air resistance against the fuselage 1. Furthermore, the thrust generators (the left thrust generator 33 and the right thrust generator 34) used for the moment control around the roll axis are different from the thrust generators (the fore thrust generator 31 and the aft thrust generator Section 32) used for the force control in the Y-axis direction, thereby allowing the control force to be greater in a case where the moment control around the roll axis and the force control in the Y-axis direction are simultaneously performed. This also applies to a case where the moment control around the pitch axis and the force control in the X-axis direction are simultaneously performed.

As described above, the air vehicle 100 is capable of separately performing six types of control including control of the three forces in the X-axis, Y-axis, and Z-axis directions, and control of the three moments around the pitch axis, the roll axis, and the yaw axis. Accordingly, it is possible to inhibit an unnecessary change in attitude around the pitch axis, the roll axis, or the yaw axis that may occur due to the position or speed control in the X-axis, Y-axis, or Z-axis direction.

Further, when the position or attitude of the air vehicle 100 is disturbed due to disturbance or the like, it is possible to promptly return the air vehicle to the original position or the original attitude.

<Modification of Thrust Generator>

Figure 9:
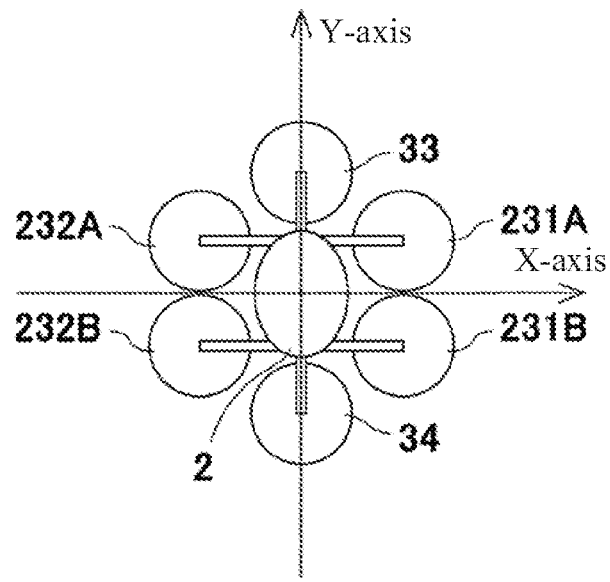
FIG. 9 is a diagram showing a modification of the air vehicle according to the first embodiment and is a plan view schematically showing a modification of the thrust generation unit.
Figure 10:
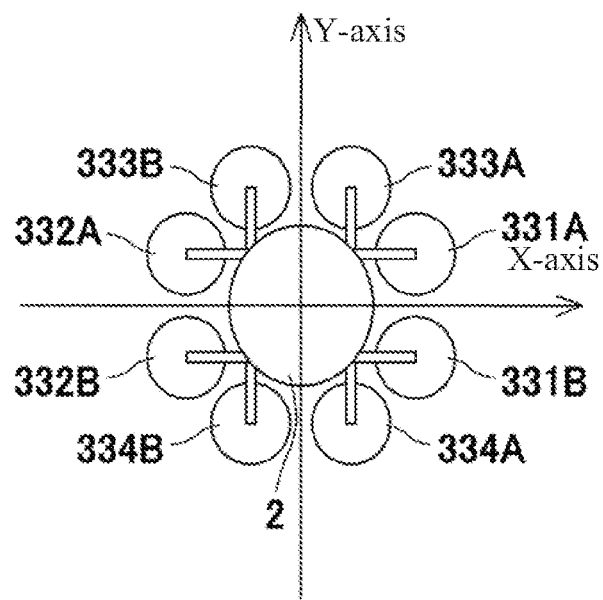
FIG. 10 is a diagram showing a modification of the air vehicle according to the first embodiment and is a plan view schematically showing a modification of the thrust generation unit.
Figure 11:
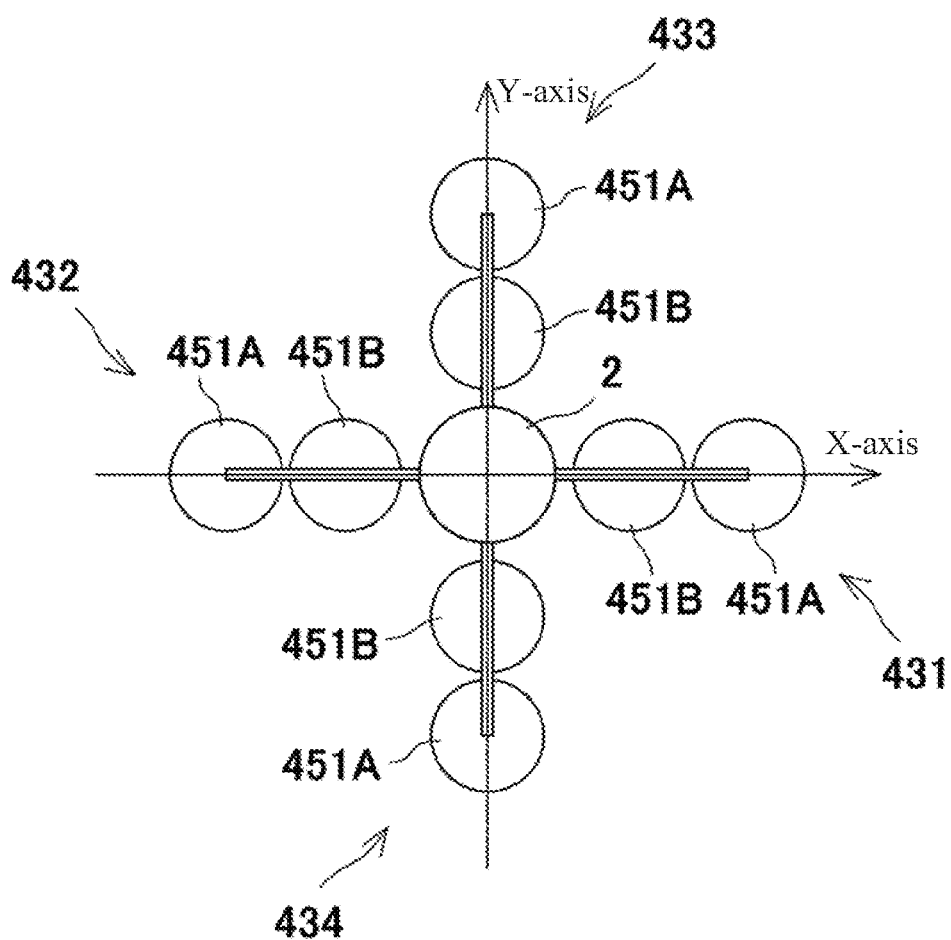
FIG. 11 is a diagram showing a modification of the air vehicle according to the first embodiment and is a plan view schematically showing a modification of the thrust generation unit.

FIGS. 9 to 11 are diagrams showing modifications of the thrust generation unit. In the above embodiment, the thrust generation unit 3 includes the four thrust generators positioned at the front, back, left, and right of the fuselage 1, namely, the fore thrust generator 31, the aft thrust generator 32, the left thrust generator 33, and the right thrust generator 34. However, the present invention is not limited to such a configuration.

Alternatively, as shown in FIG. 9, the thrust generation unit 3 may include six thrust generators positioned at the front, back, left, and right of the fuselage 1 including a first fore thrust generator 231A, a second fore thrust generator 231B, a first aft thrust generator 232A, a second aft thrust generator 232B, the left thrust generator 33, and the right thrust generator 34. The first fore thrust generator 231A and the first aft thrust generator 232A are configured to be positioned on the same axis extending in the X-axis direction. Further, the second fore thrust generator 231B and the second aft thrust generator 232B are configured to be positioned on the same axis extending in the X-axis direction. Other configurations of the first fore thrust generator 231A and the second fore thrust generator 231B are the same as the configurations of the fore thrust generator 31; thus, detailed description of the configurations will be omitted. Other configurations of the first aft thrust generator 232A and the second aft thrust generator 232B are the same as the configurations of the aft thrust generator 32; thus, detailed description of the configurations will be omitted.

Further, as shown in FIG. 10, the thrust generation unit 3 includes eight thrust generators positioned at the front, back, left, and right of the fuselage 1 including a first fore thrust generator 331A, a second fore thrust generator 331B, a first aft thrust generator 332A, a second aft thrust generator 332B, a first left thrust generator 333A, a second left thrust generator 333B, a first right thrust generator 334A, and a second right thrust generator 334B. The first left thrust generator 333A and the first right thrust generator 334A are configured to be positioned on the same axis extending in the Y-axis direction. Further, the second left thrust generator 333B and the second right thrust generator 334B are configured to be positioned on the same axis extending in the Y-axis direction. Other configurations of the first left thrust generator 333A and the second left thrust generator 333B are the same as the configurations of the left thrust generator 33; thus, detailed description of the configurations will be omitted. Other configurations of the first right thrust generator 334A and the second right thrust generator 334B are the same as the configurations of the right thrust generator 34; thus, detailed description of the configurations will be omitted. Further, the first fore thrust generator 331A and the second fore thrust generator 331B are identical in configuration to the first fore thrust generator 231A and the second fore thrust generator 231B, respectively; thus, detailed description of the configurations will be omitted. Furthermore, the first aft thrust generator 332A and the second aft thrust generator 332B are identical in configuration to the first aft thrust generator 232A and the second aft thrust generator 232B, respectively; thus, detailed explanation of the configurations will be omitted.

Furthermore, as shown in FIG. 11, a fore thrust generator 431, an aft thrust generator 432, a left thrust generator 433, and a right thrust generator 434 of the thrust generation unit 3 may each include two rotors, that is, an outer rotor 451A and an inner rotor 451B. In this configuration, the support beam 52 has the distal end connected to the outer rotor 451A and a portion near the proximal end connected to the inner rotor 451B.

<Modification of Wing Part>

Figure 12:
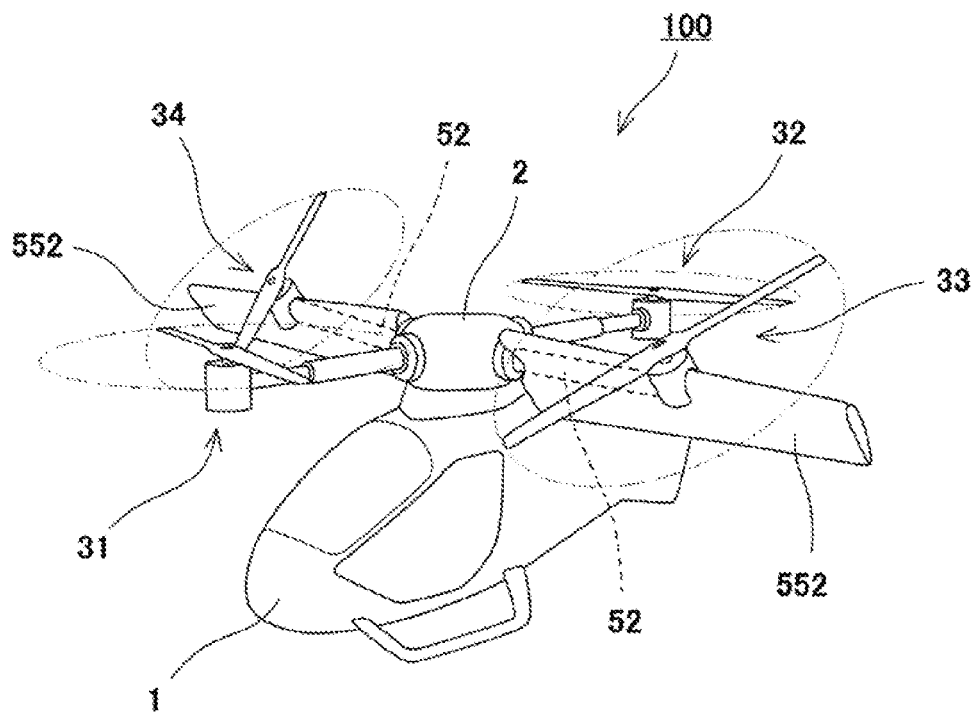
FIG. 12 is a diagram showing a modification of the air vehicle according to the first embodiment and is a perspective view showing an example of the air vehicle having a wing part integrally formed with a support beam.

FIG. 12 is a diagram showing a modification of the air vehicle 100 and is a perspective view showing an example of the air vehicle 100 including a wing part 552 integrally formed with the support beam 52.

As shown in FIG. 12, the air vehicle 100 may include the wing part 552 integrally formed with the support beam 52. The wing part 552 is positioned downstream of the rotor 51 in a direction of an air flow generated by the rotor 51 and is formed into an airfoil shape having the direction of the air flow generated by the rotor 51 as a chord direction (wing chord direction). This configuration causes, during forward flight, the chord direction of the wing part 552 to be tilted forward as a result of tilting the left thrust generator 33 and the right thrust generator 34 forward, thereby allowing most of the gravity acting on the air vehicle 100 to be supported by the lift generated by the wing part 552. Note that the wing part 552 has a base positioned corresponding to the proximal end of the support beam 52 in a direction in which the support beam 52 extends, has a portion extending from the base toward a wing tip in the direction in which the support beam 52 extends, and has the wing tip positioned beyond the distal end of the support beam 52.

<Modification of Support Beam Drive Part>

Figure 13:
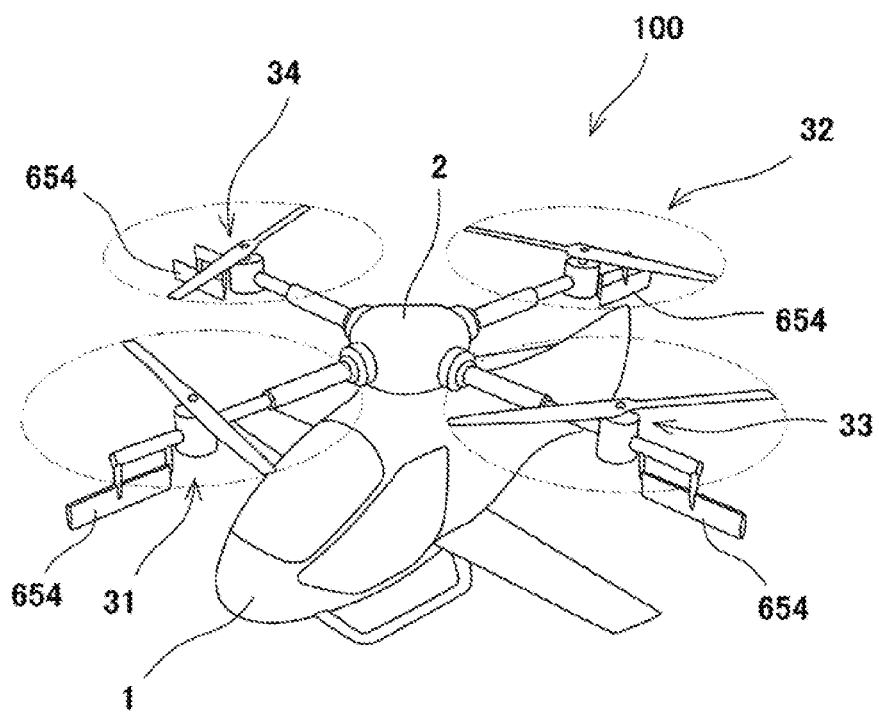
FIG. 13 is a diagram showing a modification of the air vehicle according to the first embodiment and is a perspective view showing a modification of a support beam drive part.

FIG. 13 is a diagram showing a modification of the support beam drive part.

In the above embodiment, an actuator such as an electric motor has been given as an example of the support beam drive part 54, but the support beam drive part 54 is not limited to such an actuator. Alternatively, the support beam drive part 54 may be a mechanism that changes a cyclic pitch angle of the rotor 51. Changing the cyclic pitch angle of the rotor 51 allows an aerodynamic force generated by the rotor itself to rotationally move the support beam 52.

Further, as shown in FIG. 13, the support beam drive part 54 may be a mechanism including a rudder 654 having an aerodynamic control surface, and a drive part that changes the angle of attack of the control surface of the rudder 654 with respect to the direction of the air flow generated by the rotor 51. The rudder 654 may take an angle of attack with respect to the direction of the air flow generated by the rotor 51 to generate an aerodynamic force, thereby generating a moment for rotationally moving the support beam 52 to rotationally move the support beam 52.

<Modification of Attitude Control>

Figure 14:
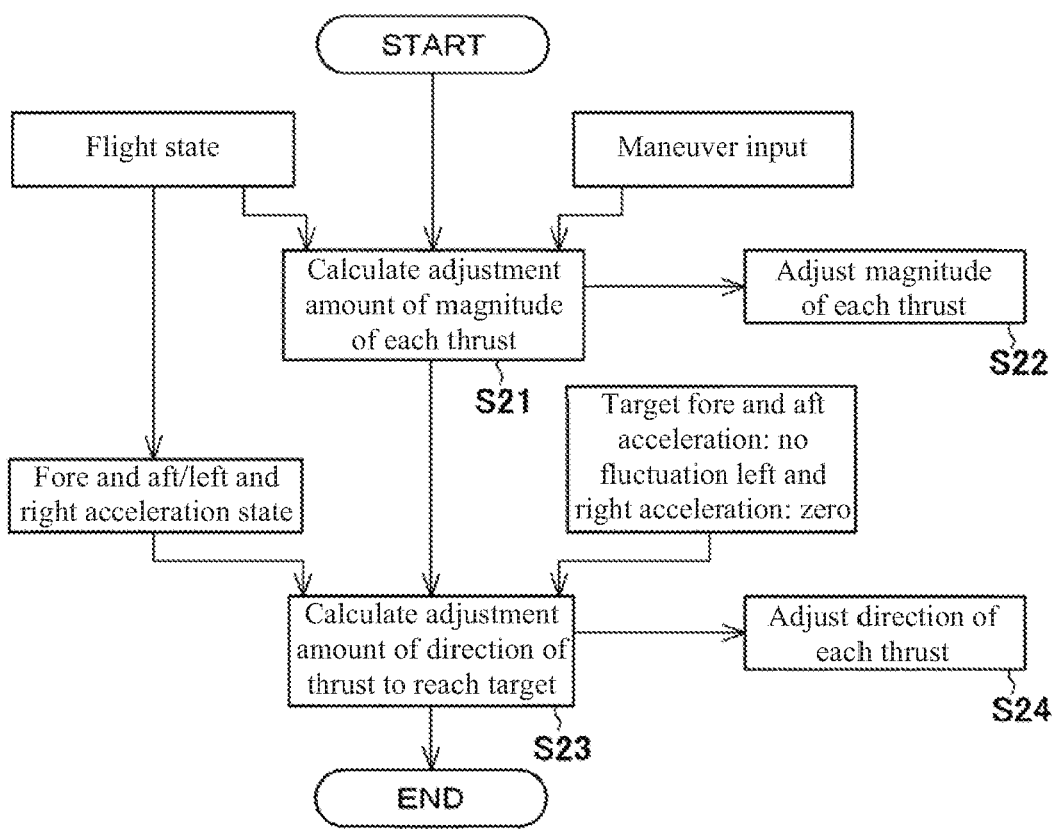
FIG. 14 is a flowchart showing a modification of the attitude control during flight of the air vehicle according to the first embodiment, the attitude control including a maneuver of the air vehicle such as a turn.

FIG. 14 is a flowchart showing a modification of the attitude control of the air vehicle 100.

In the present modification, the flight control information detector 5 detects inertia in the fore and aft direction and in the left and right direction received by the air vehicle 100 and a command input from the maneuvering apparatus.

As shown in FIG. 14, in the attitude control, the flight controller 4 first calculates, based on the flight state and the maneuver input information detected by the flight control information detector 5, the magnitude of the thrust to be generated by each of the thrust generators 31 to 34 of the thrust generation unit 3 (step S21) and controls the magnitude of the thrust of each of the thrust generators (step S22). That is, the flight controller 4 performs the moment control around the pitch axis, the moment control around the roll axis, and the force control in the Z-axis direction to cause the air vehicle 100 to follow a flight path corresponding to the maneuver input.

Next, the flight controller 4 calculates an adjustment amount of the direction of each of the thrust generators such that acceleration in the fore and aft direction and/or in the left and right direction received by the fuselage 1 is in a target state (step S23), and controls the direction of the thrust generated by each of the thrust generators (step S24). That is, the flight controller 4 performs the force control in the X-axis direction and the Y-axis direction such that a state of acceleration received by the fuselage 1 approaches a target acceleration state.

The target acceleration state in the fore and aft direction is, for example, a state in which there is no fluctuation. Acceleration may occur in the fore and aft direction due to the control of the angle of attack of the fixed wing part 11, and bringing the target acceleration state into the state in which there is no fluctuation makes it possible to prevent the control according to step 24 from interfering with the control of the angle of attack. Then, the flight controller 4 causes the direction of the thrust generated by the left thrust generator 33 to tilt toward the fore side or the aft side around the third axis R3 such that the acceleration state approaches the target acceleration state, that is, a fluctuation in inertia in the fore and aft direction is reduced. Furthermore, the flight controller 4 causes the direction of the thrust generated by the right thrust generator 34 to tilt toward the fore side or the aft side around the fourth axis R4 that is identical to the side toward which the direction of the thrust generated by the left thrust generator 33 is tilted. This configuration allows a component in the fore and aft direction of the fuselage 1 of the thrust generated by the thrust generation unit 3 to be controlled. Note that, in a case where the control of the angle of attack of the fixed wing part 11 is not performed, the target acceleration in the fore and aft direction may be zero.

Further, the target acceleration state in the left and right direction is, for example, zero. Then, the flight controller 4 causes the direction of the thrust generated by the fore thrust generator 31 to tilt toward the left side or the right side around the first axis R1 such that the acceleration state approaches the target acceleration state, that is, a fluctuation in inertia in the left and right direction is reduced. Furthermore, the flight controller 4 causes the direction of the thrust generated by the aft thrust generator 32 to tilt toward the left side or the right side around the second axis R2 that is identical to the side toward which the direction of the thrust generated by the fore thrust generator 31 is tilted. This configuration allows a component in the left and right direction of the fuselage 1 of the thrust generated by the thrust generation unit 3 to be controlled.

Accordingly, the air vehicle 100 flies while adjusting the magnitude of the thrust of each of the thrust generators to change the entire attitude of the air vehicle 100 so as to follow the flight path desired by the pilot or an automatic maneuvering apparatus, so that the air vehicle 100 can quickly correct disturbance in attitude caused by the maneuvering or the influence of disturbance such as a gust by controlling the direction of each of the thrust generators. Further, it is possible to make the fluctuations in the inertia in the fore and aft direction and in the left and right direction received by the fuselage smaller to make the ride comfort for the occupant better, and to make a moment of inertia for the movement performed by controlling only the direction of each of the thrust generators small compared to the configuration where the direction of the entire fuselage is controlled through control of only the magnitude of the thrust generated by each of the thrust generators, thereby improving the responsiveness.

Second Embodiment

Figure 15:
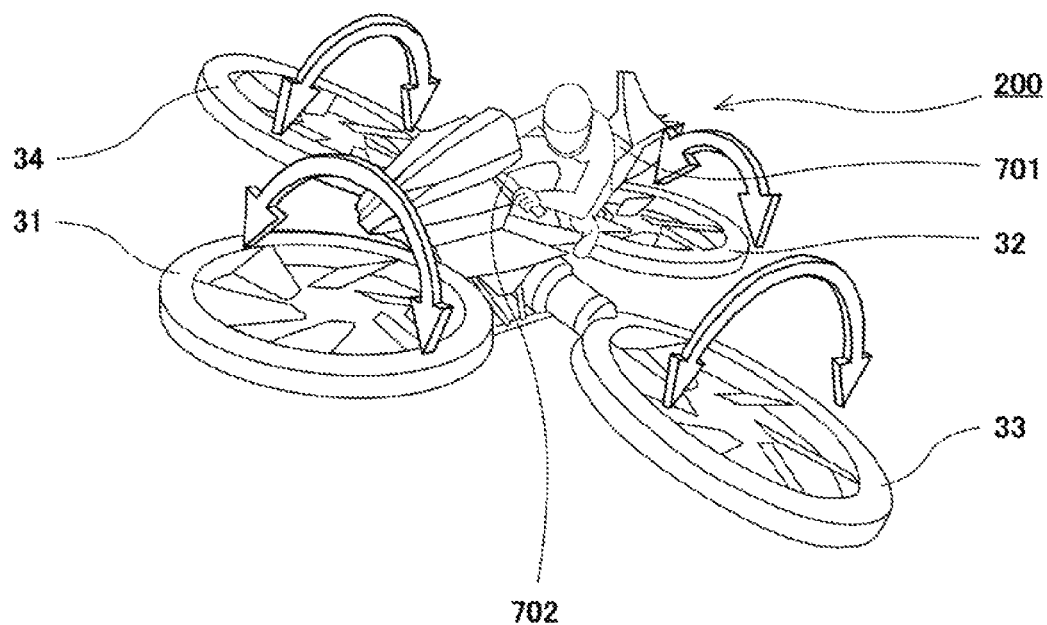
FIG. 15 is a perspective view showing a configuration example of an air vehicle according to a second embodiment.

FIG. 15 is a perspective view showing a configuration example of the air vehicle 200 according to a second embodiment.

As shown in FIG. 15, in the present embodiment, the fuselage 1 includes a seat 701 to be straddled by the pilot. A handle 702 is disposed at the front of the seat 701, and the pilot can ride in the air vehicle 100 while straddling the seat 701 and grasping the handle 702. This configuration allows, in the manned air vehicle 100, the fuselage 1 to be simplified in configuration and reduced in weight, and allows the thrust generation unit 3 to be downsized. Further, even when the attitude of the fuselage 1 becomes unstable due to disturbance, the attitude of the pilot can be made stable, and the pilot can easily grasp the attitude of the fuselage.

From the above description, it is apparent to those skilled in the art that many modifications or other embodiments of the present invention may be made. Accordingly, the above description is to be construed as illustrative only, and is provided for the purpose of teaching those skilled in the art the best mode of carrying out the present invention. It is possible to substantially change the details of the structure and/or function of the present invention without departing from the spirit of the present invention.

REFERENCE SIGNS LIST

R1 first axis
R2 second axis
R3 third axis
R4 fourth axis
1 fuselage
2 support part
3 thrust generation unit
4 flight controller
31 fore thrust generator
32 aft thrust generator
33 left thrust generator
34 right thrust generator
100 air vehicle

The invention claimed is:
1. An air vehicle comprising:
a fuselage;
a support part configured to support the fuselage;
a thrust generation unit including a fore thrust generator, an aft thrust generator, a left thrust generator, and a right thrust generator; and
a flight controller configured to control the thrust generation unit, wherein
the fore thrust generator is positioned on a first axis extending in a fore and aft direction of the support part and at front of the support part and is connected to the support part, the fore thrust generator being configured to generate thrust in a direction intersecting the first axis and to be capable of changing magnitude of the thrust and a direction of the thrust around the first axis,
the aft thrust generator is positioned on a second axis extending in the fore and aft direction of the support part and at back of the support part and is connected to the support part, the aft thrust generator being configured to generate thrust in a direction intersecting the second axis and to be capable of changing magnitude of the thrust and a direction of the thrust around the second axis,
the left thrust generator is positioned on a third axis extending in a left and right direction of the support part and at left of the support part and is connected to the support part, the left thrust generator being configured to generate thrust in a direction intersecting the third axis and to be capable of changing magnitude of the thrust and a direction of the thrust around the third axis, and
the right thrust generator is positioned on a fourth axis extending in the left and right direction of the support part and at right of the support part and is connected to the support part, the right thrust generator being configured to generate thrust in a direction intersecting the fourth axis and to be capable of changing magnitude of the thrust and a direction of the thrust around the fourth axis,
the flight controller causes the direction of the thrust generated by the fore thrust generator to tilt toward a left side or a right side around the first axis and causes the direction of the thrust generated by the aft thrust generator to tilt toward a left side or a right side around the second axis that is identical to the side toward which the direction of the thrust generated by the fore thrust generator is tilted to control a component in the left and right direction of the fuselage of the thrust generated by the thrust generation unit,
the flight controller causes a difference between the thrust generated by the fore thrust generator and the thrust generated by the aft thrust generator, and controls an attitude of the fuselage around a pitch axis,
the flight controller causes a difference between the thrust generated by the left thrust generator and the thrust generated by the right thrust generator, and controls an attitude of the fuselage around a roll axis, and
the flight controller calculates a direction of a resultant force of inertia and gravity received by the fuselage, and controls the thrust generation unit to tilt the fuselage such that the direction of the resultant force and a yaw axis of the fuselage coincide with each other.
2. The air vehicle according to claim 1, wherein
the flight controller causes
the direction of the thrust generated by the left thrust generator to tilt toward a fore side or an aft side around the third axis and causes the direction of the thrust generated by the right thrust generator to tilt toward a fore side or an aft side around the fourth axis that is identical to the side toward which the direction of the thrust generated by the left thrust generator is tilted to control a component in the fore and aft direction of the fuselage of thrust generated by the thrust generation unit.

3. The air vehicle according to claim 1, wherein the flight controller causes the directions of the thrust generated by the fore thrust generator, the thrust generated by the aft thrust generator, the thrust generated by the left thrust generator, and the thrust generated by the right thrust generator to tilt toward a same side in a circumferential direction around an axis extending in a vertical direction of the support part to control an attitude of the fuselage around the yaw axis.

4. The air vehicle according to claim 1, wherein the fuselage is configured to accommodate an occupant.

5. The air vehicle according to claim 1, wherein
the fore thrust generator, the aft thrust generator, the left thrust generator, and the right thrust generator each include
a rotor configured to rotate around an axis extending in a direction intersecting a corresponding axis among the first axis, the second axis, the third axis, and the fourth axis,
a support beam having a distal end connected to the rotor and a proximal end connected to the support part rotatably around the corresponding axis,
a rotor drive part configured to rotate the rotor, and
a support beam drive part configured to rotationally move the support beam around the corresponding axis.

6. The air vehicle according to claim 1, wherein the fuselage includes a seat to be straddled by a pilot.

\* \* \* \* \*